United States Patent [19]

Suzuki et al.

[11] Patent Number: 5,333,679
[45] Date of Patent: Aug. 2, 1994

[54] CLIMATE CONTROL SYSTEM FOR MOTOR VEHICLE

[75] Inventors: Shigeru Suzuki; Tatsuyuki Hoshino; Osamu Hiramatsu; Kunifumi Goto, all of Kariya, Japan

[73] Assignee: Kabushiki Kaisha Toyoda Jidoshokki Seisakusho, Aichi, Japan

[21] Appl. No.: 79,674

[22] Filed: Jun. 18, 1993

[30] Foreign Application Priority Data

Jun. 19, 1992 [JP] Japan ................. 4-160690

[51] Int. Cl.5 .................. F25B 29/00; B60H 1/20
[52] U.S. Cl. ........................ 165/43; 165/42; 237/12.3 R; 237/12.3 B; 62/323.4; 62/501; 122/26; 126/247
[58] Field of Search ............. 237/12.3 R, 12.3 B; 165/42, 43; 62/323.4, 323.1, 501, 243; 122/26; 126/247

[56] References Cited

U.S. PATENT DOCUMENTS

| | | | |
|---|---|---|---|
| 2,888,810 | 6/1959 | Hann | 62/215 |
| 4,172,493 | 10/1979 | Jacobs | 165/42 |
| 4,352,456 | 10/1982 | Brandenburg, Jr. | 237/12.3 R |
| 5,085,269 | 2/1992 | Aoki | 237/12.3 R |

FOREIGN PATENT DOCUMENTS

| | | | |
|---|---|---|---|
| 0034242 | 8/1981 | European Pat. Off. | 237/12.3 B |
| 3012760 | 10/1981 | Fed. Rep. of Germany | 237/12.3 B |
| 3506040 | 9/1985 | Fed. Rep. of Germany | 237/12.3 B |
| 3-57877 | 3/1991 | Japan . | |

Primary Examiner—John K. Ford
Attorney, Agent, or Firm—Burgess, Ryan & Wayne

[57] ABSTRACT

A climate control system incorporated in a motor vehicle having a hydraulic pump directly driven by a vehicle engine to deliver a working oil under pressure to be supplied to either a hydraulic motor for driving a refrigerant compressor of an air-conditioning system or a heat conversion unit of the heating system via a hydraulic flow control valve for controlling the flow direction of the working oil. The air-conditioning system has an evaporator for cooling the air supplied to the vehicle compartment. In the heat conversion unit of the heating system, pressure energy of the working oil is converted to thermal energy thereof by which the engine cooling water is heated to thereby heat the air supplied to the vehicle compartment via a radiator unit made of a heater core.

5 Claims, 3 Drawing Sheets

CLIMATE CONTROL SYSTEM FOR MOTOR VEHICLE

BACKGROUND OF THE INVENTION

1. Field of the Invention

The present invention relates to a climate control system for heating and air-conditioning the cabin or compartment of a motor car. More particularly, it relates to a climate control system suitable for being accommodated in a motor vehicle used in cold regions.

2. Description of the Related Art

FIG. 3 illustrates a climate control system for a motor vehicle used in cold regions in the world, according to a prior art.

The climate control system of FIG. 3 is provided with a rotary heat generator 92, for an air-heating purpose, and a refrigerant compressor 93, for an air-conditioning purpose, driven by a vehicle engine, respectively. The refrigerant compressor 93 together with an evaporator 94, a condenser 95, and an expansion valve (not shown in FIG. 3) constitute the air-conditioning system of the climate control system. Namely, the compressor 93 compresses and delivers a compressed refrigerant gas toward the evaporator 94 disposed in a climate control duct 96, via the condenser 95.

The rotary heat generator 92 is provided with a rotatable element (not shown in FIG. 3) immersed in an oil and driven by the vehicle engine 91. The rotating energy of the rotatable element of the rotary heat generator 92 is converted into thermal energy which in turn heats the cooling water W of the engine, and the heated water is used for heating air in a heater core 97 disposed in the climate control duct. A valve 98 is a bypass valve or enabling a part of the cooling water W of the engine 91 to flow from the engine 91 toward the rotary heat generator 92.

In the above-mentioned conventional climate control system for a motor vehicle, it is understood that a drive energy provided by a vehicle engine is converted into thermal energy for heating the air in the cabin of the motor vehicle. Although it takes a rather long time for the temperature of the cooling water W of the engine to be warmed up by the engine 92 after starting of the engine, the climate control system can work as a quick air heater for a motor vehicle to be used for running in the cold regions.

Nevertheless, the conventional climate control system is provided with such an arrangement that the rotary heat generator 92 in addition to the refrigerant compressor 93 must be driven by the vehicle engine 91, via a motion transmitting belt. Therefore, many equipments such as the radiator 99, the refrigerant compressor 93, an electric alternator (not shown in FIG. 3), an engine starter, and the rotary heat generator 92 must be disposed in a front part of an engine compartment, and accordingly, it is often difficult to acquire a space sufficient for collectively installing much equipment in front of the vehicle engine, when the engine compartment is made narrower as is the recent tendency.

SUMMARY OF THE INVENTION

Therefore, an object of the present invention is to provide a climate control system capable of quickly heating and cooling the air in a motor vehicle, and of achieving a neat and compact disposition of various equipment indispensable for the system on the front side of an engine compartment of the motor vehicle.

In accordance with the present invention, there is provided a climate control system for a motor vehicle having an engine and a climate-controlled compartment, which comprises a hydraulic pump unit operatively connected to and driven by the engine so as to deliver a working oil under pressure, a heat conversion unit hydraulically connected to the hydraulic pump unit for receiving the working oil under pressure from the hydraulic pump unit and for converting a pressure energy of the received working oil into a thermal energy thereof, a heat radiating unit operatively connected to the heat conversion unit for radiating the thermal energy of the working oil to the climate-controlled compartment by means of air supplied to the climate-controlled compartment, an air-conditioning system including therein a refrigerant compressor unit, a hydraulic motor unit operatively connected to both the hydraulic pump unit and the refrigerant compressor unit of the air-conditioning system, the hydraulic motor unit being supplied with the working oil under pressure by the hydraulic pump unit, thereby being operated so as to drive the refrigerant compressor unit, and a flow control unit for controlling the direction of flow of the working oil under pressure from the hydraulic pump unit toward one of the heat conversion unit and the hydraulic motor unit.

The hydraulic pump unit, when driven by the vehicle engine, delivers the working oil under pressure toward either the heat conversion unit or the hydraulic motor unit via the hydraulic flow control unit. Namely, the hydraulic flow control unit is manually or automatically operated to control the direction of flow of the working oil under pressure from the hydraulic pump unit toward one of the hydraulic motor unit and the heat conversion unit. Therefore, when the climate-controlled compartment of the motor vehicle is to be cooled, the working oil under pressure is sent toward the hydraulic motor unit which in turn drives the refrigerant compressor unit, to thereby operate the air-conditioning system.

On the other hand, when the vehicle is to be heated, especially when the cooling water of the vehicle engine is at a low temperature, the hydraulic flow control unit is operated to direct the working oil under pressure toward the heat conversion unit, and accordingly, the heat conversion unit converts the pressure energy of the working oil into the corresponding thermal energy thereof by which the air flowing in the climate-controlled compartment of the motor vehicle is eventually heated by the operation of the heat radiating unit.

It will be understood from the foregoing description that the climate control system of the present invention employs the hydraulic flow control unit for controlling the direction of the flow of the working oil under pressure delivered by the engine-operated hydraulic pump unit toward either the hydraulic pump unit of the air-conditioning system or the heat conversion unit of the heating system according to requirement. The hydraulic flow control unit is preferably comprised of a hydraulic flow control valve manually or automatically operated. Therefore, in the climate control system for a motor vehicle, according to the present invention, the vehicle engine is not needed to mechanically operate both the heat conversion unit of the heating system and the refrigerant compressor unit of the air-conditioning system. Accordingly, a load applied to the vehicle engine can be smaller than with the conventional climate control system.

Further, since only the hydraulic pump unit is operatively connected to and driven by the vehicle engine, the space needed for the installation of the various constituent units of the climate control system in the engine compartment of the vehicle can be rather small, and the vehicle engine can operate the climate control system by using only one motion transmitting unit, i.e., one set of a belt-and-pulley mechanism arranged between the vehicle engine and the hydraulic pump unit.

Moreover, since the rotating speed of the hydraulic motor unit is easily controlled by adjustably changing the amount of the working oil under pressure supplied from the hydraulic pump unit toward the hydraulic motor unit, the amount of displacement of the refrigerant compressor unit of the air-conditioning system can be easily controlled even if the compressor is not of a variable displacement type compressor but of a fixed displacement type compressor.

BRIEF DESCRIPTION OF THE DRAWINGS

The above and other objects, features and advantages of the present invention will be made more apparent from the ensuing description of a preferred embodiment thereof in conjunction with the accompanying drawings wherein.

DESCRIPTION OF THE PREFERRED EMBODIMENT

Figure 1:
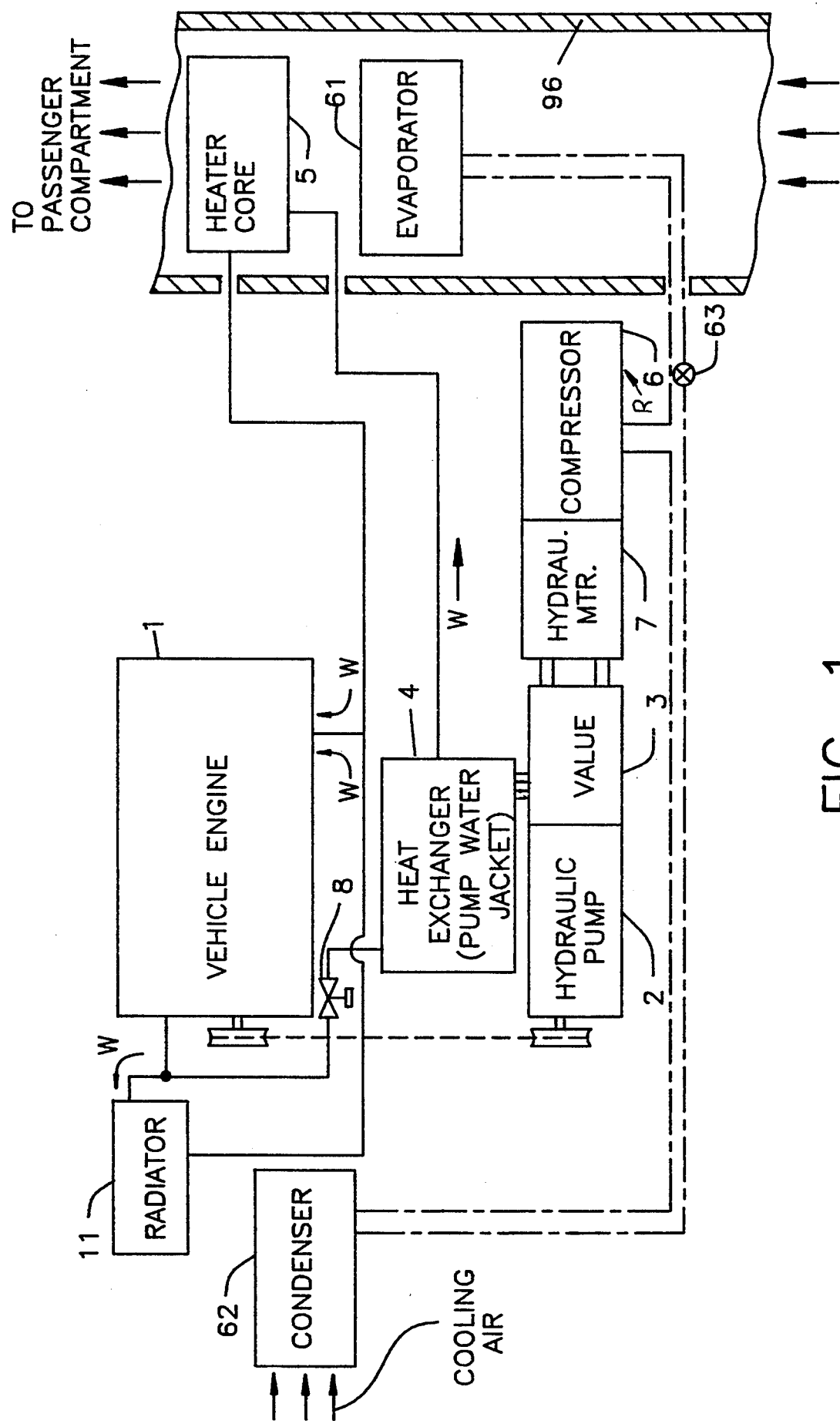
FIG. 1 is a block diagram illustrating a climate control system for a motor vehicle according to an embodiment of the present invention.

Referring to FIG. 1, the climate control system for a motor vehicle is provided with a hydraulic pump 2 driven by a vehicle engine 1 of the motor vehicle, a valve 3 having an inlet for receiving a working oil under pressure delivered from the hydraulic pump 2, a heat exchanger 4 hydraulically connected to the valve 3 and to the vehicle engine 1 for indirectly heating the cooling water W cooling the vehicle engine 1 with heat of the working oil when receiving from the valve 3, a heater core 5 capable of operating as a heat radiator unit heating air to be supplied to a climate-controlled area i.e., the vehicle cabin or a compartment for passengers and a driver, by using the heated cooling water, an air-conditioning unit R including a refrigerant compressor 6 and an evaporator 61 arranged in a climate control duct 96, a hydraulic motor 7 capable of driving the refrigerant compressor 6 when being supplied with the working oil from the hydraulic pump 2 via the valve 3, a solenoid valve 8 arranged in a pipe line running from the vehicle engine 1 to the heat exchanger 4, and capable of establishing a bypass passageway through which a part of the engine cooling water W is able to flow toward the heat exchanger 4.

Preferably, the valve 3 is assembled in the hydraulic pump 2 so as to be formed as an integral built-in unit, and the heat exchanger 4 is comprised of a water jacket arranged around the hydraulic pump 2.

A description of the hydraulic circuit of the climate control system will now be provided hereinbelow.

Figure 2:
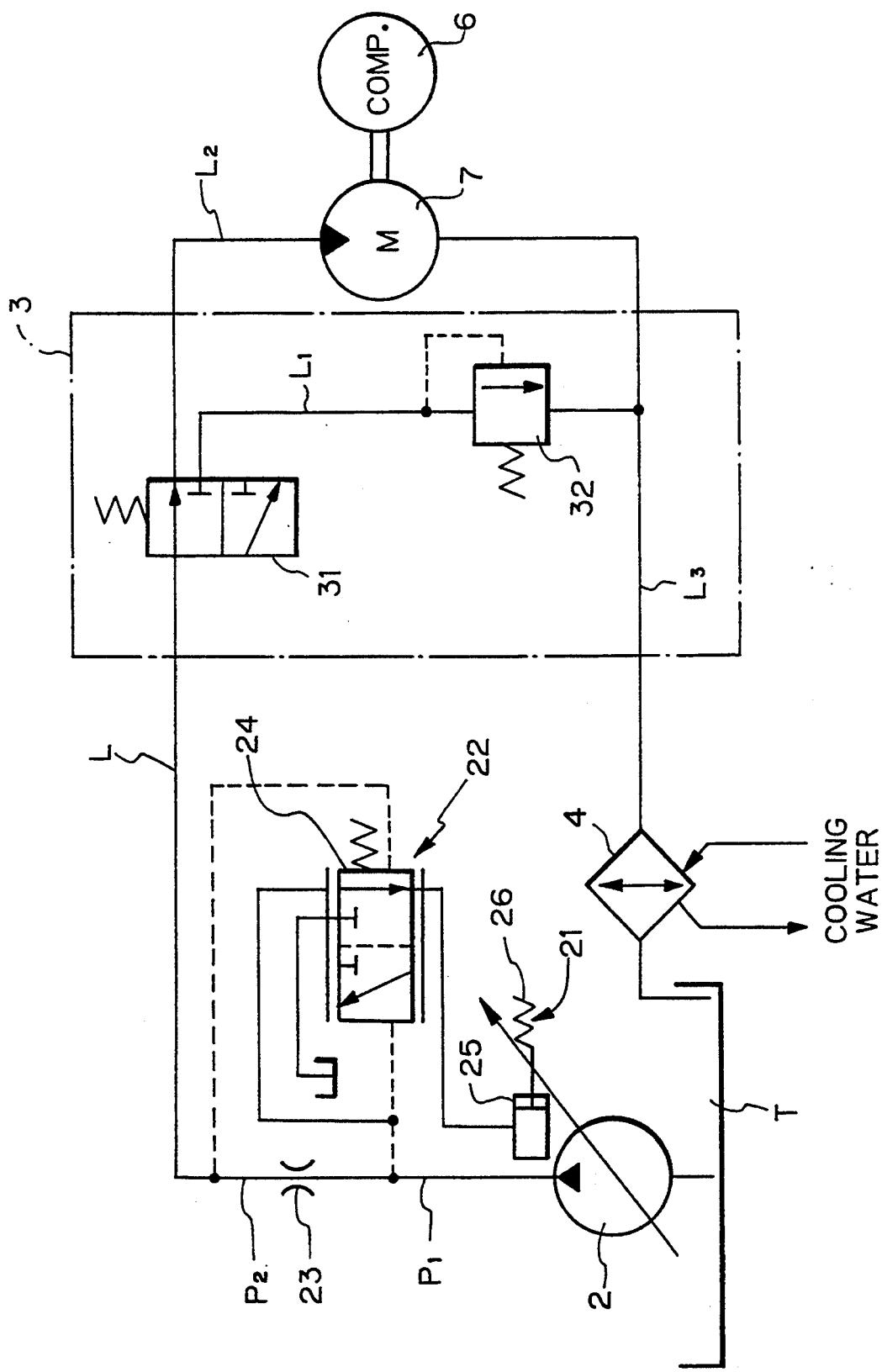
FIG. 2 is a hydraulic circuit arrangement of the climate control system of FIG. 1.
Figure 3:
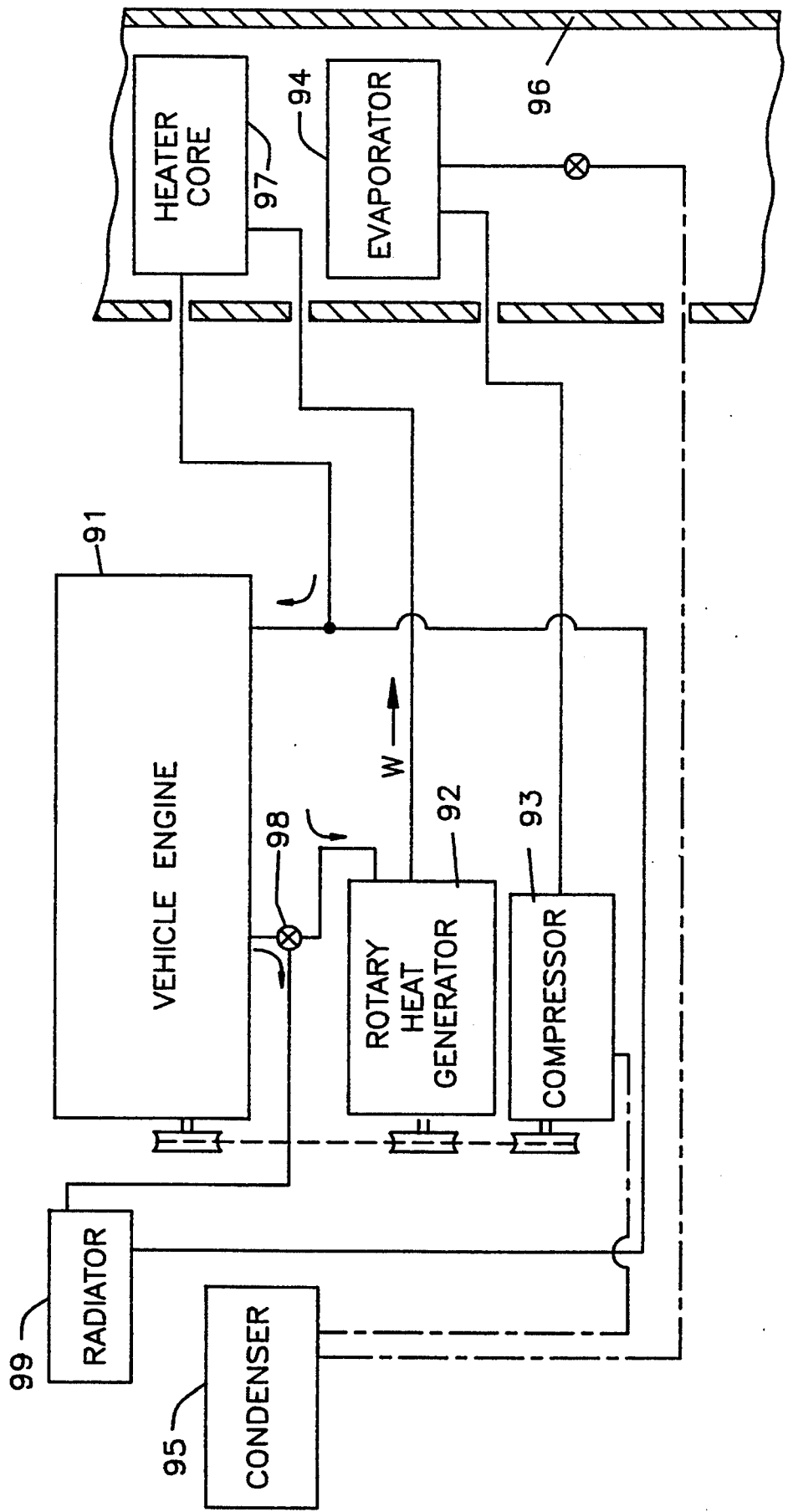
FIG. 3 is a block diagram illustrating a climate control system for a motor vehicle according to a prior art.

Referring to FIG. 2, the hydraulic pump 2 preferably comprised of a variable capacity pump unit is mechanically driven by the vehicle engine 1 to deliver a working oil under pressure, via a belt-and-pulley mechanism ( not shown FIG. 2 ). The hydraulic pump 2 includes a capacity control mechanism 21 and a flow regulating unit 22 therein.

The working oil under pressure delivered by the hydraulic pump 2 flows through a working oil supply line L, and advances toward either a first working oil line $L_1$ or a second working oil line $L_2$ via a hydraulic flow control valve 31.

At the initial stage of the heating operation, the working oil flowing through the hydraulic flow control valve 31 advances, via the first working oil line $L_1$, toward a relief valve 32 which is capable of operating as a heat conversion unit to convert the pressure energy of the working oil into the corresponding thermal energy of the working oil.

During the air-conditioning operation of the climate control system, the working oil flowing through the flow control valve 31 advances, via the second working oil line $L_2$, toward the hydraulic motor 7. The first and second working oil lines $L_1$ and $L_2$ are commonly joined to a return working oil line $L_3$ that runs toward an oil tank T in which the return working oil is discharged.

The afore-mentioned flow regulating unit 22 is comprised of a choke 23 intervened in the working oil supply line L, and a proportional-control type hydraulic flow control valve 24. When the pressures of the working oil before and after passing the choke 23 are assumed to be $P_1$ and $P_2$, the hydraulic flow control valve 24 is operated in response to a pressure differential $\Delta P$ ($=P_1-P_2$) and a spring force $P'$ of a built-in spring. When the amount of working oil under pressure delivered by the hydraulic pump 2 increases so as to raise the pressure differential $\Delta P$, the spool of the flow control valve 24 is moved toward the right-hand direction in FIG. 2. The capacity control unit 21 of the hydraulic pump 2 is provided with a control cylinder 25 and a spring 26 which are arranged so as to provide a swash plate of the pump 2 with mutually opposite pressures. Therefore, when the spool of the flow control valve 24 is moved toward the right-hand direction in FIG. 2, the pressure of the working oil applied to a piston of the control cylinder 25 is reduced. Accordingly, the swash plate of the hydraulic pump 2 is urged by the spring force of the spring 26 toward a small inclination angle position and the amount of working oil delivered by the hydraulic pump 2 is reduced.

On the other hand, when the capacity of the working oil delivered by the hydraulic pump 2 is reduced so as to lower the pressure differential $\Delta P$, the spool of the hydraulic flow control valve 24 is moved toward the left-hand direction in FIG. 2, due to the spring force exerted by the built-in spring, and as a result, the pressure of the working oil applied to the piston of the control cylinder 25 is increased so as to move the swash plate of the hydraulic pump 2 toward a large inclination angle position and the amount of working oil delivered by the hydraulic pump 2 is increased. Namely, the amount of working oil delivered by the hydraulic pump 2 is adjustably regulated at a predetermined level.

The hydraulic pump 2 can be disconnected from the vehicle engine 1 by a solenoid-operated clutch (not shown in FIGS. 1 and 2) except for at the above-mentioned initial stage of the heating operation, and at the air-conditioning stage. The operation of the solenoid-operated clutch and the afore-mentioned hydraulic flow control valve 31 is manually controlled by switches disposed on the control panel of the vehicle and operated by a driver. Nevertheless, when required, the operation of the clutch and the flow control valve 31 may be automatically controlled in response to change in the temperature in the vehicle compartment. The flow control valve 31 and the relief valve 32 constitute the aforementioned valve 3 of FIG. 1.

During the air-conditioning operation of the climate control system of the present invention, the hydraulic motor 7 is operated by the working oil, supplied by the hydraulic pump 2, and drives the refrigerant compressor 6. As best shown in FIG. 1, the refrigerant compressor 6 together with the evaporator 61, a condenser 62, and an expansion valve 63 constitute the aforementioned air-conditioning system. The evaporator 61 is arranged in the climate control duct 96 in order to cool the air flowing through the duct 96.

At the initial stage of the heating operation, the relief valve 32 supplied with the working oil under pressure converts the pressure energy of the working oil into thermal energy by which the working oil was heated. Thus, the high temperature working oil in turn heats the cooling water W by the heat exchanger 4 disposed in the return working oil line $L_3$.

A description of the engine cooling system will be provided below.

The cooling water W is delivered from the vehicle engine 1 due to the pumping operation of a water pump (not shown in FIGS. 1 and 2) built in the vehicle engine. When delivered, the cooling water W is sent to a radiator 11 arranged in front of the engine 1, and is cooled there. The cooled water W returns to the vehicle engine 1, to thereby cool the engine 1.

On the other hand, when the cooling water W is still at a low temperature condition during the heating stage of the climate control system, the solenoid-operated valve 8 is opened so as to permit a part of the cooling water W to flow through the open solenoid-operated valve 8 toward the heat exchanger 4 by which the cooling water W is heated. The heated cooling water W flows from the heat exchanger 4 into the heater core 5 in the climate control duct 96. Therefore, the heater core 5 heats the air in the duct 96, and the heated air flows toward the climate-controlled compartment of the motor vehicle through the duct 96.

The cooling water W leaving from the heater core 5 returns to the vehicle engine 1. The amount of the cooling water W bypassed toward the heat exchanger 4 via the solenoid-operated valve 8 is determined by a ratio between first and second flow resistances acting on the cooling water W, namely, the first flow resistance acting on the cooling water W while it flows in a cooling water circuit running through the solenoid-operated valve 8, the heat exchanger 4, and the heater core 5, and the second flow resistance acting on the cooling water W while it flows through the radiator 11. Of course, it should be understood that the solenoid-operated valve 8 can be proportionally controlled in response to the temperature of the cooling water W that passes through the solenoid-operated valve 8.

When the vehicle engine 1 is warmed up, and accordingly, the temperature of the cooling water W is raised, the cooling water W leaving the radiator 11 is sufficiently warm. Thus, the solenoid-operated clutch is disconnected from the vehicle engine 1 so as to stop the operation of the hydraulic pump 2. The air passing through the radiator 11 can be introduced into the climate-controlled compartment of the vehicle, to thereby warm the compartment.

The disconnection of the solenoid-operated clutch from the vehicle engine 1 may be manually operated or automatically controlled.

In the described embodiment, if either the working oil W immediately after it is delivered by the hydraulic pump 2 can be directly returned to the oil tank T or if the swash plate of the hydraulic pump 2 can be constantly kept at a small inclination angle position, the working oil will not be supplied to the hydraulic flow control valve 31 (FIG. 2). Then, it is possible to omit the above-mentioned solenoid-operated clutch.

Further, with the described embodiment of the climate control system, if the motor vehicle should be rapidly accelerated, it is possible to disconnect the solenoid-operated clutch from the vehicle engine 1 to thereby temporarily increase the drive power of the engine 1.

Moreover, the hydraulic pump 2 and the hydraulic motor 7 of the described embodiment may be formed as one integral unit as required. If necessary, the hydraulic pump 2, the hydraulic motor 7, and the refrigerant compressor 6 may also be formed as one integral unit. Still further, a part of the working oil under pressure, delivered by the hydraulic pump 2 may be routed toward the power steering mechanism of the motor vehicle so as to operate the power steering mechanism.

In the described embodiment of the climate control system, the hydraulic pump 2 is of a variable capacity type. Thus, even when the vehicle engine 1 is rotated at a high speed, the speed of the hydraulic motor 7, and thus that of the refrigerant compressor 6 can be maintained at a suitable level.

Further, when the refrigerant compressor 6 is of a fixed capacity type, the speed of the hydraulic motor 7, thus the speed of the compressor 6 may be adjustably changed by adjusting the working oil pressure when the working oil is delivered through the flow control unit 22. As a result, the fixed capacity compressor 6 can be operated at various capacities thereof.

It should be understood that various modifications and variations will occur to persons skilled in the art without departing from the scope and spirit of the present invention claimed in the accompanying claims.

We claim:

1. A climate control system for a motor vehicle having a drive engine and a climate-controlled compartment, comprising:

a hydraulic pump means operatively connected to and driven by said engine so as to deliver a working oil under pressure;

a heat conversion means hydraulically connected to said hydraulic pump means for receiving the working oil under pressure from said hydraulic pump means and for converting a pressure energy of the received working oil into a thermal energy thereof;

a heat radiating means operatively connected to said heat conversion means for radiating the thermal energy of the working oil to the climate-controlled compartment by means of air supplied to the climate-controlled compartment;

an air-conditioning system including therein a refrigerant compressor means;

a hydraulic motor means operatively connected to both said hydraulic pump means and said refrigerant compressor means of said air-conditioning system, said hydraulic motor means being supplied with the working oil under pressure by said hydraulic pump means, thereby being operated so as to drive said refrigerant compressor means; and a flow control means for controlling a direction of flow of the working oil under pressure from said hydraulic pump means toward one of said heat conversion means and said hydraulic motor means the flow control means comprising:

a hydraulic-flow control valve hydraulically connected to said hydraulic pump means, said hydraulic-flow control valve having a first oil outlet hydraulically connected to said hydraulic motor means and a second oil outlet; and a hydraulic relief valve having an oil inlet connected to the second oil outlet of said hydraulic flow control valve, said hydraulic relief valve being operative as said heat conversion means, and hydraulically connected to a heat exchanger means comprising:

a water jacket means arranged around said hydraulic pump, and permitting a part of the engine cooling water to be heated therein, said water jacket means being hydraulically connected to said heat radiating means, to thereby supply said heat radiating means with cooling water heated by said water jacket means.

2. A climate control system according to claim 1, further comprising a flow control valve means for permitting a part of the engine cooling water to flow from said vehicle engine toward said water jacket means.

3. A climate control system according to claim 1, wherein said hydraulic pump means comprises:

a variable capacity hydraulic pump having a swash plate capable of changing the inclination angle thereof;

a capacity control means for controlling the inclination angle of said swash plate of said variable capacity hydraulic pump; and a flow regulating means for controlling the amount of the working oil under pressure delivered by said variable capacity hydraulic pump.

4. A climate control system according to claim 1, wherein said hydraulic pump means is operatively connected to said vehicle engine via a belt-and-pulley mechanism.

5. A climate control system according to claim 1, wherein said refrigerant compressor means of said air-conditioning system comprises a fixed capacity type refrigerant compressor directly driven by said hydraulic motor means.

* * * * *